United States Patent
Chen et al.

(10) Patent No.: US 11,847,188 B2
(45) Date of Patent: Dec. 19, 2023

(54) IMAGE RECOGNITION METHOD AND DEVICE BASED ON DEEP CONVOLUTIONAL NEURAL NETWORK

(71) Applicant: Shenzhen Imsight Medical Technology Co., Ltd., Shenzhen (CN)

(72) Inventors: Hao Chen, Shenzhen (CN); Yu Hu, Shenzhen (CN); Zhizhong Chai, Shenzhen (CN); Guangwu Qian, Shenzhen (CN)

(73) Assignee: Shenzhen Imsight Medical Technology Co., Ltd., Shenzhen (CN)

( * ) Notice: Subject to any disclaimer, the term of this patent is extended or adjusted under 35 U.S.C. 154(b) by 325 days.

(21) Appl. No.: 17/189,156

(22) Filed: Mar. 1, 2021

(65) Prior Publication Data
US 2022/0198214 A1    Jun. 23, 2022

(30) Foreign Application Priority Data
Dec. 17, 2020   (CN) .......................... 202011492450.9

(51) Int. Cl.
*G06K 9/62* (2022.01)
*G06K 9/32* (2006.01)
(Continued)

(52) U.S. Cl.
CPC ........... *G06F 18/2431* (2023.01); *G06N 3/08* (2013.01); *G06T 7/0012* (2013.01); *G06V 10/255* (2022.01); *G06T 2207/10116* (2013.01); *G06T 2207/30064* (2013.01); *G06T 2207/30096* (2013.01)

(58) Field of Classification Search
CPC .... G06F 18/2431; G06V 10/255; G06N 3/08; G06T 7/0012; G06T 2207/10116; G06T 2207/30064; G06T 2207/30096
See application file for complete search history.

(56) References Cited

U.S. PATENT DOCUMENTS

| | | | |
|---|---|---|---|
| 9,589,374 B1 * | 3/2017 | Gao | A61B 6/5211 |
| 2006/0067587 A1 * | 3/2006 | Sakai | G06T 5/009 |
| | | | 382/254 |

(Continued)

OTHER PUBLICATIONS

Abedalla A, Abdullah M, Al-Ayyoub M, Benkhelifa E. 2st-unet: 2-stage training model using u-net for pneumothorax segmentation in chest x-rays. In2020 International Joint Conference on Neural Networks (IJCNN) Jul. 19, 2020 (pp. 1-6). IEEE. (Year: 2020).*

(Continued)

*Primary Examiner* — Bobbak Safaipour
*Assistant Examiner* — Duy Tran
(74) *Attorney, Agent, or Firm* — Zhigang Ma

(57) ABSTRACT

A method includes the following steps: pre-processing chest X-ray films to obtain initial X-ray film images that meets format requirements; screening the initial X-ray film images to detect whether they are posteroanterior chest images; inputting the posteroanterior chest images into a binary classification model of the deep convolutional neural network for negative and positive classification; inputting the images presenting positive results into a detection model of the deep convolutional neural network to detect a disease type and label an outline of a lesion area in each image; and displaying the disease type and lesion area corresponding to the image.

9 Claims, 3 Drawing Sheets

(51) Int. Cl.
G06T 7/00 (2017.01)
G06N 3/08 (2023.01)
G06F 18/2431 (2023.01)
G06V 10/20 (2022.01)

(56) References Cited

U.S. PATENT DOCUMENTS

2018/0033144 A1* 2/2018 Risman ................. G06T 7/0014
2018/0144214 A1* 5/2018 Hsieh .................... G06T 7/0002
2019/0156484 A1* 5/2019 Nye ....................... G16H 30/20

OTHER PUBLICATIONS

Wang Y, Sun L, Jin Q. Enhanced diagnosis of pneumothorax with an improved real-time augmentation for imbalanced chest X-rays data based on DCNN. IEEE/ACM transactions on computational biology and bioinformatics. Apr. 19, 2019;18(3):951-62. (Year: 2019).*

* cited by examiner

IMAGE RECOGNITION METHOD AND DEVICE BASED ON DEEP CONVOLUTIONAL NEURAL NETWORK

TECHNICAL FIELD

The present invention relates to the technical field of medical treatment, in particular to an image recognition method and device based on a deep convolutional neural network.

BACKGROUND ART

A chest X-ray film is a common tool for examining or diagnosing chest diseases. In top grade hospitals, the daily average number of X-ray films produced is very large. On the one hand, doctors who read the X-ray films will gradually form accumulative fatigue during the long-term reading process, which may lead to incorrect diagnosis; on the other hand, in small hospitals in towns, although the average daily filming volume is not large, doctors who read X-ray films are inexperienced, which may lead to incorrect diagnosis. This urgently needs an auxiliary diagnosis tool that can help doctors reduce misdiagnosis or provide diagnostic information.

With the development of deep learning, more and more deep convolutional neural network algorithm technologies have been applied to medical images, and thus an AI intelligent auxiliary diagnosis system has emerged.

Most of the existing AI intelligent auxiliary diagnosis methods are characterized in that: slice-level disease labels are acquired from reports through natural language processing by using internationally public datasets (such as ChestXray14) or report data collected from hospitals; a multi-label classification network model or a plurality of single disease classification models is then trained; chest X-ray films are then predicted; disease feature information learned by the deep convolutional neural network model is converted into a form of a thermodynamic diagram by using a class activation mapping (or weighted gradient class activation mapping) method; and where an approximate lesion area of the disease is located can be seen from the thermodynamic diagram, so as to further assist the doctor in diagnosis.

First of all, films in the internationally public dataset are uneven in quality, resulting in poor-quality films having overexposure, incorrect position, poor imaging and the like. Moreover, with respect to internationally public datasets or data collected by hospitals, most of labels of these datasets are extracted from diagnostic reports. However, the extraction method cannot guarantee that the labels are completely correct. The deep convolutional neural network trained with this kind of data will seriously deviate from an actual doctor's diagnosis result.

Secondly, a prediction result of the above method is a 2-point result; or can only label a suspected lesion area, but is free of a disease type or sign corresponding to this suspected lesion area; or can only make a prompt on suspected diseases, but cannot give a corresponding lesion area. That is, the prior art is basically based on the whole-film disease classification, and does not specifically locate a disease's position. Even if the class activation mapping technology is used to achieve weak-supervised semantic segmentation, the information of the lesion area is often not accurate enough, and the false positive rate is high.

Because clinicians need to accurately write the specific position of the disease in a diagnosis report, the prior art methods are inconsistent with the clinical diagnosis, and it is also difficult to provide effective assistance in assisting the doctor in the diagnosis.

SUMMARY OF THE INVENTION

With respect to the above technical solutions, embodiments of the present invention provide an image recognition method and device based on a deep convolutional neural network in order to solve the technical problem that the AI intelligent auxiliary diagnosis method given by traditional algorithms cannot provide the type of a disease corresponding to a lesion area and is thus low in interpretability.

In a first aspect, an embodiment of the present invention provides an image recognition method based on a deep convolutional neural network. The method comprises the following steps: pre-processing chest X-ray films to obtain initial X-ray film images that meets format requirements; screening the initial X-ray film images to detect whether they are posteroanterior chest images; inputting the posteroanterior chest images into a binary classification model of the deep convolutional neural network for negative and positive classification; inputting the posteroanterior chest images presenting positive results into a detection model of the deep convolutional neural network to detect a disease type of each posteroanterior chest image and label an outline of a lesion area in the image; and displaying the disease type and lesion area corresponding to the image.

Optionally, the step of pre-processing the chest X-ray films to obtain the initial X-ray film images that meets format requirements comprises: mapping all pixel values of each chest X-ray film to a normal distribution to obtain a window width and a window level; and removing noise pixels outside a window width interval, and mapping the removed pixels to an interval range of 0 to 255 to obtain the initial X-ray film image.

Optionally, the step of screening the initial X-ray film images specifically comprises: inputting the initial X-ray film images to a posteroanterior chest screening model for screening, wherein the posteroanterior chest screening model comprises a Resnet-34 feature extraction network and two fully-connected neural networks, wherein the Resnet-34 feature extraction network is used to perform chest feature extraction on each initial X-ray film image; the first fully-connected neural network is used to determine whether the chest feature is a posteroanterior chest position; and the second fully-connected neural network is used to confirm a photometric interpretation of the chest feature.

Optionally, prior to inputting the posteroanterior chest images into the binary classification model of the deep convolutional neural network, the method further comprises: if the photometric interpretation of the chest feature means that a pixel value rises in a grayscale range from light to dark, processing pixels of the initial X-ray film image to obtain a photometric interpretation that a pixel value raises in a grayscale range from dark to bright.

Optionally, the binary classification model of the deep convolutional neural network is used to perform chest feature extraction on the initial X-ray film images, and perform negative and positive classification on the extracted chest features.

Optionally, the detection model of the deep convolutional neural network comprises a feature extraction network, a feature fusion network, an area generation network, a qualitative determination device, a localizer, and a segmenter, wherein an output of the feature extraction network serves as an input of the feature fusion network; an output of the feature fusion network serves as an input of the area generation network; an output of the area generation network serves as an input of the qualitative determination device, wherein the qualitative determination device is used to detect a disease type of the posteroanterior chest image; an output of the area generation network serves as an input of the locator, wherein the locator is used to locate the lesion area; and an input of the locator serves as an output of the segmenter, wherein the segmenter is used to label an outline of the lesion area.

Optionally, the method further comprises: in the case that a classification result in the binary classification model of the deep convolutional neural network is positive, but a disease confidence level output by the detection model of the deep convolutional neural network is less than a set threshold, forcefully outputting, by the detection model of the deep convolutional neural network, the outlet and the disease type of the lesion area corresponding to the maximum confidence level.

Optionally, the method further comprises: visually displaying the lesion area and the disease type corresponding to the lesion area in a chest disease report.

Optionally, a training set of the binary classification model of the deep convolutional neural network and a training set of the detection model of the deep convolutional neural network both come from an image archiving and communication system.

In a second aspect, an embodiment of the present invention provides an image recognition device, comprising a memory, a processor, a communication bus, and an image recognition program stored in the memory, wherein the communication bus is used to realize a communication connection between the processor and the memory; and the processor is used to execute the image recognition program to implement the steps of the above image recognition method.

According to the image recognition method and system based on the deep convolutional neural network provided by the embodiments of the present invention, whether the chest X-ray films are negative or positive can be screened, the lesion areas can also be positioned, and meanwhile, the types or signs of the diseases in the lesion areas can be labeled, thereby providing doctors with more interpretable reference opinions so as to promote the efficiency of the doctor's report and reduce the workload.

BRIEF DESCRIPTION OF THE DRAWINGS

One or more embodiments are exemplified by the pictures in the corresponding accompanying drawings, and these exemplified descriptions do not constitute a limitation on the embodiments. Elements with the same reference numerals in the accompanying drawings represent similar elements. Unless otherwise stated, the pictures in the accompanying drawings do not constitute a scale limitation.

DETAILED DESCRIPTION

In order to facilitate the understanding of the present invention, the present invention will be described in more detail below with reference to the accompanying drawings and specific embodiments. It should be also noted that when a component is referred to as "being fixed to" the other component, the component can be directly disposed on the other component, or there may be one or more intermediate components therebetween. When a component is referred to as "being connected with" the other component, the component can be directly connected to the other component, or there may be one or more intermediate components therebetween. Orientation or positional relationships indicated by the terms "upper", "lower", "inner", "outer", "bottom", etc. are orientation or positional relationships shown on the basis of the drawings, only for the purposes of the ease in describing the present disclosure and simplification of its descriptions, but not indicating or implying that the specified device or element has to be specifically located, and structured and operated in a specific direction, and therefore, should not be understood as limitations to the present invention. Moreover, the terms "first", "second", "third" and the like are only for the purpose of description and should not be construed as indicating or implying relative importance.

Unless defined otherwise, all technical and scientific terms used herein have the same meaning as commonly understood by one of ordinary skill in the art to which the present invention belongs. The terms used herein in the description of the present invention are for the purpose of describing particular embodiments only and are not intended to limit the present invention. The term "and/or" as used herein includes any and all combinations of one or more of the associated listed items.

The present invention provides an intelligent auxiliary diagnosis method and system that can quickly screen negative and positive chest X-ray films and accurately locate lesion areas in the chest. The main functions of the method and system are to quickly screen out positive films through a binary classification model of a deep convolutional neural network so as to achieve the effect of removing negative films quickly; then to accurately locate the lesion area in each positive film and predict which disease it belongs to through another detection model of the deep convolutional neural network, thereby providing doctors with interpretable reference opinions more effectively. In this way, the work efficiency of doctors can be improved and the workload of doctors can be reduced.

The specific implementation process of the method and the training process of the binary classification model of the deep convolutional neural network and the detection model of the deep convolutional neural network will be described below first in detail.

Figure 1:
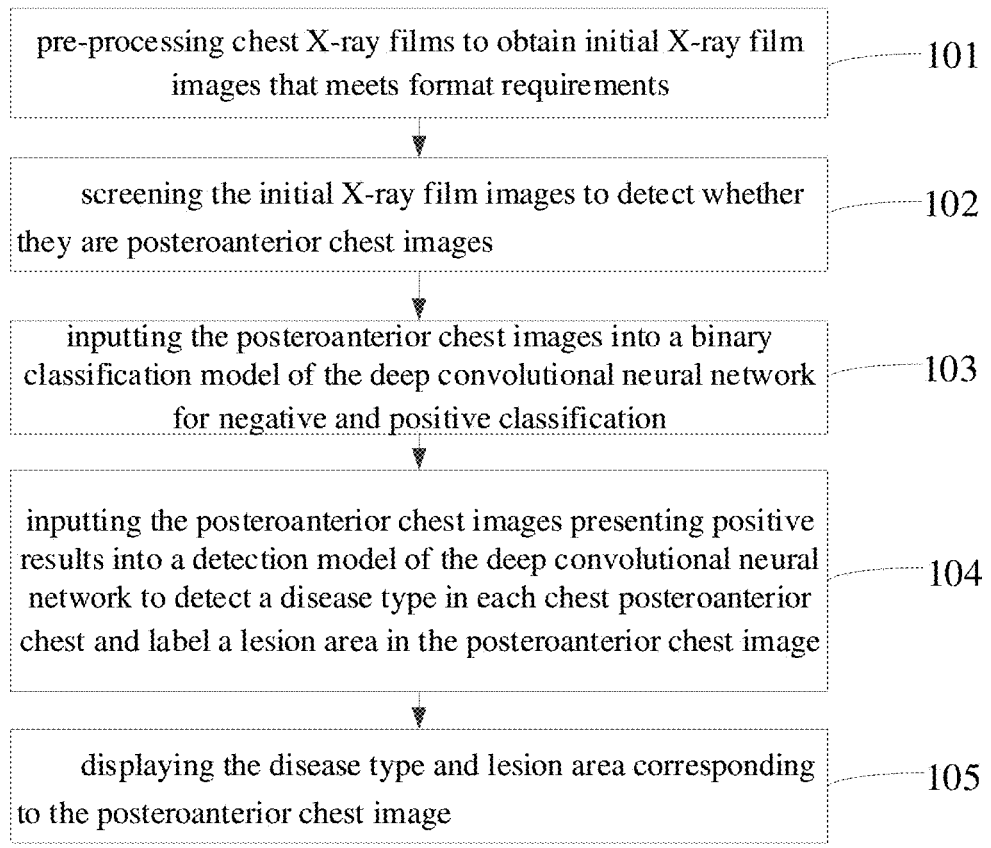
FIG. 1 is a schematic flowchart of an image recognition method based on a deep convolutional neural network according to an embodiment of the present invention.

FIG. 1 is an image recognition method based on a deep convolutional neural network provided by an embodiment of the present invention. As shown in FIG. 1, the method comprises the following steps.

In 101, pre-processing chest X-ray films to obtain initial X-ray film images that meets format requirements.

In this step, the chest X-ray films are converted into formats required by the following several models.

Specifically, according to the method of the present invention, by mapping all pixel values on each X-ray film to the normal distribution, a width of a pixel interval (μ−3σ, μ+3σ) is used as a window width (σ is a standard deviation, μ is a mean), and the center of the interval is used as a window level; then, about 0.3% of noise pixels outside the window width interval are removed, and then the noise-removed pixels are mapped to a range of 0 to 255; and finally, the X-ray film is zoomed to the corresponding size according to input requirements of different models.

In the present invention, the input size requirement of the following posteroanterior chest screening model for posteroanterior chest film screening is: 256×256. The input size requirement of the following binary classification model of the deep convolutional neural network used for chest positive and negative screening is: 256×256.

In 102, screening the initial X-ray film images to detect whether they are posteroanterior chest images.

Figure 2:
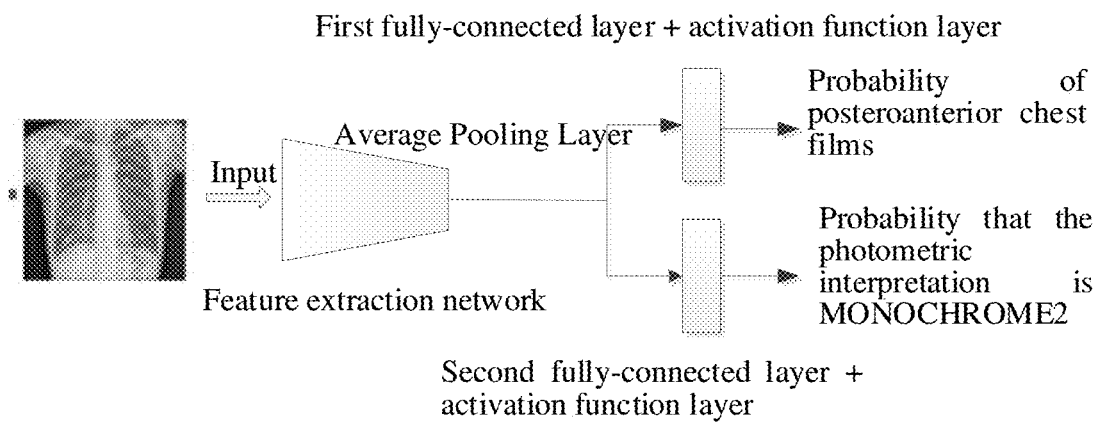
FIG. 2 is a structural frame diagram of a posteroanterior chest screening model provided by an embodiment of the present invention.

The step of screening the initial X-ray film images specifically comprises: inputting the initial X-ray film images into a posteroanterior chest screening model for screening. In this embodiment of the present invention, the main function of the posteroanterior chest screening model is to determine whether the inputted initial X-ray film image is a posteroanterior chest film, and determinate that its photometric explanation is that a pixel value (MONOCHROME1) rises in a gray range from light to dark or a pixel value (MONOCHROME2) that rises in the gray scale from dark to light. A structural framework of the model is shown in FIG. 2.

Since the method of the present invention is only applicable to posteroanterior chest films, it is necessary to screen whether the chest is in a posteroanterior position. In the actual operation process, in the case of operation errors of the doctor or film reading staff, the information of the photometric interpretation may be entered incorrectly, resulting in a completely opposite situation of imaging. In actual operation, the doctor can manually adjust its MONOCHROME1 to MONOCHROME2 when reading a film in order to remedy this operation error. However, in the method of the present invention, the photometric interpretation attribute information of data header information will not need to be read, so the photometric interpretation is added to the posteroanterior chest screening model to automatically determine whether the information of the photometric interpretation is entered incorrectly or not.

Specifically, the posteroanterior chest screening model comprises a Resnet-34 feature extraction network and two fully-connected neural networks, wherein the Resnet-34 feature extraction network is used to perform chest feature extraction on each initial X-ray film image; the first fully-connected neural network is used to determine whether the chest feature is a posteroanterior chest position; and the second fully-connected neural network is used to confirm a photometric interpretation of the chest feature.

In step 101, the picture data having a size requirement of 256×256 is obtained for the screening of the posteroanterior chest film. The treatment process of inputting the picture data of 256×256 into the posteroanterior chest screening model is as follows.

First, the picture data of 256×256 is copied twice, and then overlapped into a structure of 3×256×256 and then converted into a structure of 1×3×256×256.

The picture data having the structure of 1×3×256×256 is then inputted to the Resnet-34 feature extraction network for network extraction to obtain a feature map of 1×1024×8×8.

The 1×1024×8×8 feature map is processed by an average pooling layer to obtain a 1×1024×1×1 vector, which is then converted into a 1×1024 structure. Next, this structure is respectively inputted to the first fully-connected neural network and the second fully-connected neural network, each of which has one output channel, to obtain two values respectively. Finally, the two values are processed with a sigmoid activation function layer.

Figure 3:
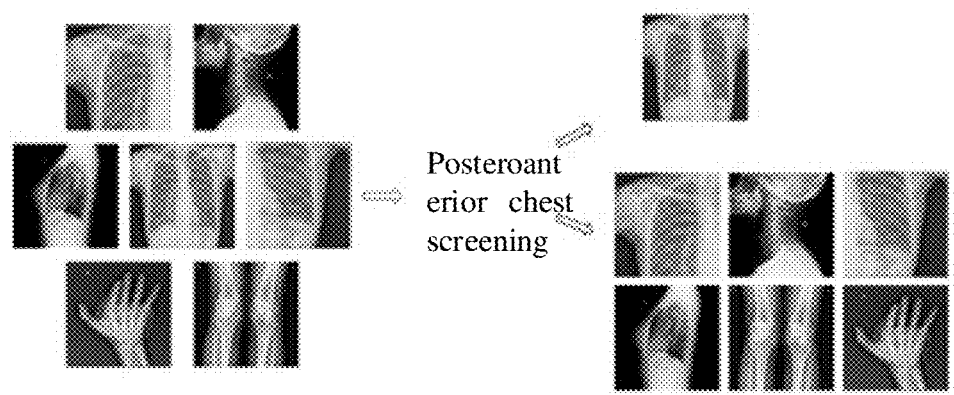
FIG. 3 is a schematic diagram of a posteroanterior chest screening process based on a deep convolutional neural network according to an embodiment of the present invention.

Eventually, two probability values with thresholds ranging from 0 to 1 are obtained, wherein the probability value corresponding to the first fully-connected neural network represents a probability that the inputted image data is the posteroanterior chest film. By default, if this probability value is greater than or equal to 0.5, it means that this picture data is the posteroanterior chest film, otherwise it is not the posteroanterior chest film. The screening result is as shown in FIG. 3.

The probability value corresponding to the second fully-connected neural network represents a probability that the photometric interpretation of the inputted picture data is MONOCHROME2. By default, if this value is greater than or equal to 0.5, it means that the photometric interpretation of this picture data is MONOCHROME2, otherwise it is MONOCHROME1.

When the photometric interpretation is MONOCHROME1, the inputted picture data needs to be transformed in such a manner: adding 255 to an opposite number of each value so as to adjust MONOCHROME1 to MONOCHROME2.

It should be noted that the posteroanterior chest screening model, the following binary model of the deep convolutional neural network for chest negative and positive screening, and the following detection model of the deep convolutional neural network for positioning and qualitative determination of the chest lesion area are all obtained by training training data that matches the clinical real environment.

The process of making the training data specifically includes the following steps:
1. collecting chest X-ray images and corresponding diagnosis reports from a hospital;
2. performing desensitization and quality control on the collected chest X-ray images;
3. analyzing the images in advance based on the diagnosis reports;
4. reviewing and labeling the chest X-ray images by a doctor; and
5. reviewing again by algorithm personnel.

In the present invention, the chest X-ray images and corresponding diagnostic reports are collected from the hospital in such a way: the chest X-ray image data is acquired from hospital's PACS (Picture Archiving and Communication Systems) or a DR or CR device through a DICOM protocol, and the films and their diagnosis reports are then collected according to strict search conditions (as shown in Table 1).

TABLE 1

| Image pulling | Device type | DR (Digital Radiography, direct digital X-ray photography system), CR (Computed |

TABLE 1-continued

| condition setting | | Radiography, computer X-ray imaging system) |
|---|---|---|
| | Device details | The first examination room, the second examination room . . . (Do not move the data generated by DR, because most of the data generated by moving DR are sensed by sensors and cannot be used for model training) |
| | Examined area | Chest (files containing the posteroanterior chest position, such as posteroanterior chest position, lateral chest position) |
| | Patent's age | 20 to 100 years old (excluding children's films) |
| | Diagnosis conclusion | Tuberculosis, nodules, thickened pleura, pneumonia, pneumothorax, pleural effusion, lump, atelectasis, enlarged heart shadow, fracture, pulmonary fibrosis |
| | Examination time | It is recommended to screen on an annual basis and to ensure no duplication. |
| | Negative and positive | Positive (if some PACS systems have negative and positive options, then choose positive) |
| Diagnostic report content | | Examination number + patient ID + image findings + diagnosis conclusion |

For desensitization and quality control of the collected chest X-ray images, it is necessary to eliminate some sensitive information, such as a patent's name, a testing institution's name, and a doctor's name. Then, the collected chest X-ray images are preliminarily screened to remove a large number of lateral and non-chest X-ray films. Some missing chest non-posteroanterior films and other poor-quality films (i.e., these containing picture data that fails to meet training requirements, such as overexposure, poor imaging, bedside films, children's films) are further removed by manual quality control and review.

When X-ray images are analyzed in advance based on a diagnosis report, since the large volume of data are collected from the hospital and most of the films are negative (even if the "positive" has been selected during the operation), it is impossible to take all the data to the doctor to label them. Therefore, the present invention proposes a method of extracting keywords from the diagnosis report when training data. When disease's keywords and treated keywords exist at the same time, it is considered that the patient does not suffer from this disease, thereby picking up positive data quickly. According to specific needs, a certain number of different disease categories are selected for labeling, which can greatly reduce the labeling cost.

When doctors label and approve the X-ray films, the X-ray films can be labeled by a low-seniority doctor first, and a lesion area can be labeled in a form of polygon. The labels are then checked by a high-seniority doctor in such a manner of mainly checking whether there are any mistakes or omissions in the labels from the low-seniority doctor. If there are any omissions, he/she will supplement information to the labels, and if there are mistakes, he/she will correct the labels.

The algorithm personnel review the labels again because they have professional experience in training deep convolutional neural network. Only rigorous and accurate labeled data can train an accurate network model. Therefore, the algorithm personnel will review the data labeled by the doctors. The main content to be reviewed is the conscientiousness of the labeled polygons. For example, some polygons about pleural effusion are excessively large to cover a background area outside the lung, and thus need to be corrected.

The training data produced by the above method is close to the real clinical environment, and the data quality is high.

In 103, inputting the posteroanterior chest images into a binary classification model of the deep convolutional neural network for negative and positive classification.

Figure 4:
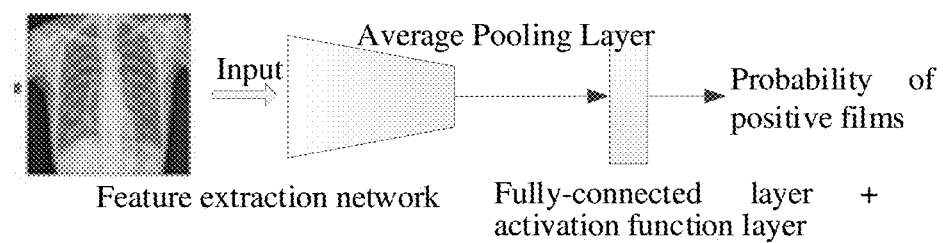
FIG. 4 is a structural framework diagram of a binary classification model of a deep convolutional neural network provided by an embodiment of the present invention.

In this embodiment, the main function of the binary classification model of the deep convolutional neural network is to quickly analyze the negative and positive of the chest X-ray films. The structural framework of the model is shown in FIG. 4.

In step 101, the picture data having a size requirement of 256×256 is obtained for the screening of the posteroanterior chest films. The process of inputting the picture data of 256×256 into the the binary classification model of the deep convolutional neural network is as follows.

First, the picture data of 256×256 is copied twice, and then overlapped into a structure of 3×256×256 and then converted into a structure of 1×3×256×256.

The picture data having the structure of 1×3×256×256 is then inputted to a Densenet-121 feature extraction network for network extraction to obtain a feature map of 1×1024×8×8.

The 1×1024×8×8 feature map is processed by an average pooling layer to obtain a 1×1024×1×1 vector, which is then converted into a 1×1024 structure. Next, this structure is inputted to a fully-connected neural network with one output channel to obtain a value. Finally, this value is processed with a sigmoid activation function.

Eventually, the probability value with a threshold ranging from 0 to 1 is obtained, wherein the probability value represents a probability that the inputted picture data is a positive film. By default, if this probability value is greater than or equal to 0.5, it means that the picture data is a positive film, otherwise it is a negative film.

In 104, the posteroanterior chest images presenting positive results are inputted into a detection model of the deep convolutional neural network to detect a disease type of each posteroanterior chest image and label an outline of a lesion area the posteroanterior chest image.

In this embodiment, the main function of the detection model of the deep convolutional neural network is to locate a specific lesion area in the positive film, and perform qualitative analysis on a specific disease type in each located area. The types of diseases in the chest lesion area include the following 17 types: atelectasis, enlarged heart shadow, pleural effusion, infiltration, lump, nodules, pneumonia, pneumothorax, lung consolidation, pulmonary edema, emphysema, pulmonary fibrosis, pleural thickening, diaphragmatic hernia, tuberculosis, rib fracture, and aortic calcification.

Figure 5:
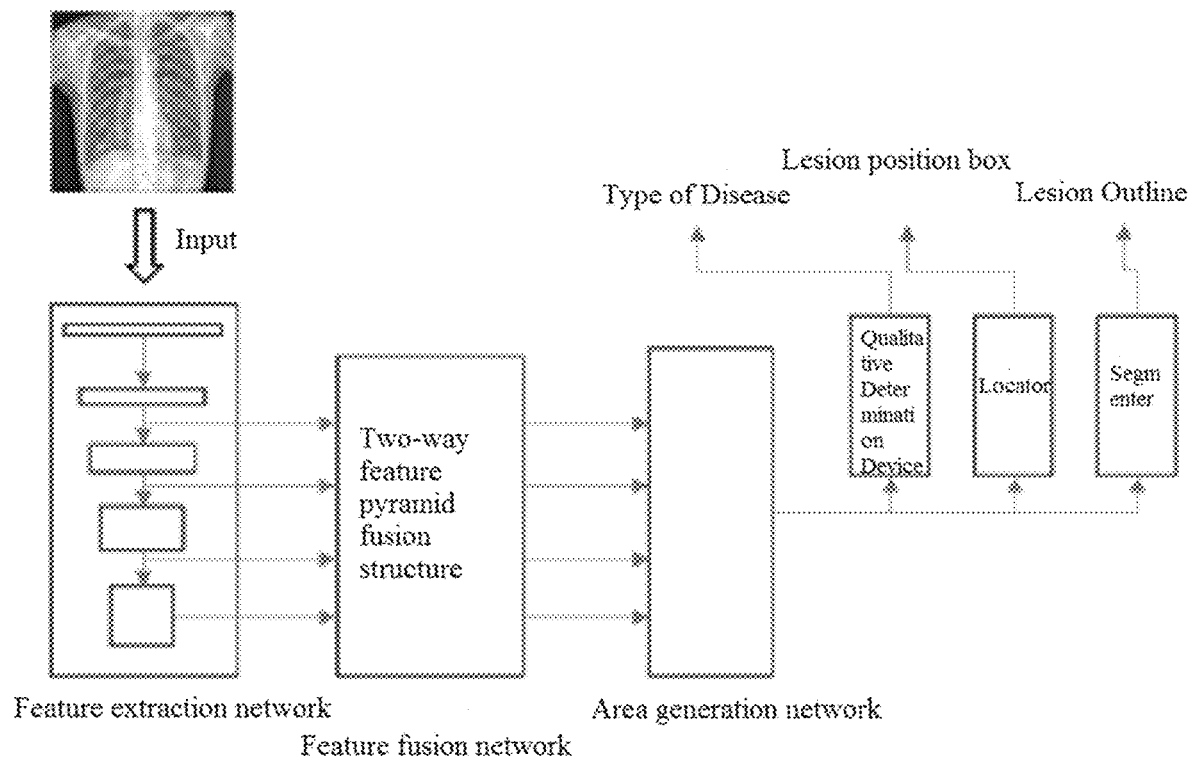
FIG. 5 is a structural framework diagram of a detection model of a deep convolutional neural network provided by an embodiment of the present invention.

The structural framework of the detection model of the deep convolutional neural network is shown in FIG. 5. The detection model mainly includes a feature extraction network, a feature fusion network, an area generation network, a qualitative determination device, a locator and a segmenter.

The feature extraction network adopts an efficient Net-b2 structure, and the feature fusion network adopts a two-way feature pyramid fusion structure, such that more representative features can be extracted more effectively, and the information of shallow-high-level semantic features can be well fused to provide basis for subsequent positioning and qualitative determination.

The area generation network consists of a convolutional layer and two independent convolutional layers. The first convolutional layer functions to preliminarily analyze the feature information of the inputted picture data, and buffer a direct influence of a back-propagation gradient on a main line during training. One of the two independent convolutional layers is used to predict a candidate box of a lesion area, and the other is used to predict a probability value that the candidate box is a lesion area.

The qualitative determination device is used to qualitatively analyze the candidate box outputted by the area generation network, analyze whether the candidate box has a disease, and if it has a disease, predict which of the above 17 diseases or signs it belongs to. The locator is used to further optimize the candidate box outputted by the area generation network, so as to output a more accurate positioning frame. The segmenter functions to segment the lesion area optimized by the locator to find a precise outline of the lesion area.

In step 101, the picture data having a size requirement of 640×640 is obtained for the screening of the posteroanterior chest films. The process of inputting the picture data of 640×640 into the detection model of the deep convolutional neural network is as follows.

After a picture of a 1×3×768×768 structure is taken as input data and processed through the feature extraction network and the feature fusion network, 1000 lesion area candidate boxes are generated by the area generation network. Then, this picture is zoomed into a feature map of a 1000×256×7×7 structure by using a bilinear difference method in combination with these 1000 lesion area candidate boxes and their corresponding feature maps, and then input to the qualitative determination device and the locator. Each candidate box will be analyzed, and confidence levels of 18 categories (17 categories of diseases or signs +1 category of no disease) and the corresponding refined boxes (a total of 18 refined boxes) are output. The category with the highest confidence level and the refined box corresponding to that category are then selected as an output. Finally, an outline of a lesion area is segmented by the segmenter (the coordinate information of the outline will finally be zoomed back to an original size of 768×768).

After all detections are completed in the above steps, it is also necessary to sort and output the output information of the chest posteroanterior film screening model, the binary classification model of the deep convolutional neural network, and the detection model of the deep convolutional neural network. In some embodiments, if a classification result in the binary classification model of the deep convolutional neural network is positive, but the disease confidence level outputted by the detection model of the deep convolutional neural network is less than a set threshold, in the post-processing phase, the detection model of the deep convolutional neural network will forcefully output the disease type corresponding to the maximum confidence level and the outline of the labeled lesion area.

In 105, displaying the disease type and lesion area corresponding to the image.

In this step, the outline of the lesion area in the chest posteroanterior image is labeled, and the name or sign of a disease corresponding to this outline are labeled. Meanwhile, according to the suspected probability of the lesion area, a thermodynamic diagram can be made for the doctor to make diagnosis references.

In some embodiments, the lesion area and the disease type corresponding to the lesion area are visually displayed in a chest disease report.

According to the image recognition method based on the deep convolutional neural network provided by the embodiment of the present invention, whether the chest X-ray films are negative or positive can be screened, the lesion areas can also be positioned, and meanwhile, the types or signs of the diseases in the lesion areas can be labeled, thereby providing doctors with more interpretable reference opinions so as to promote the efficiency of the doctor's report and reduce the workload.

Figure 6:
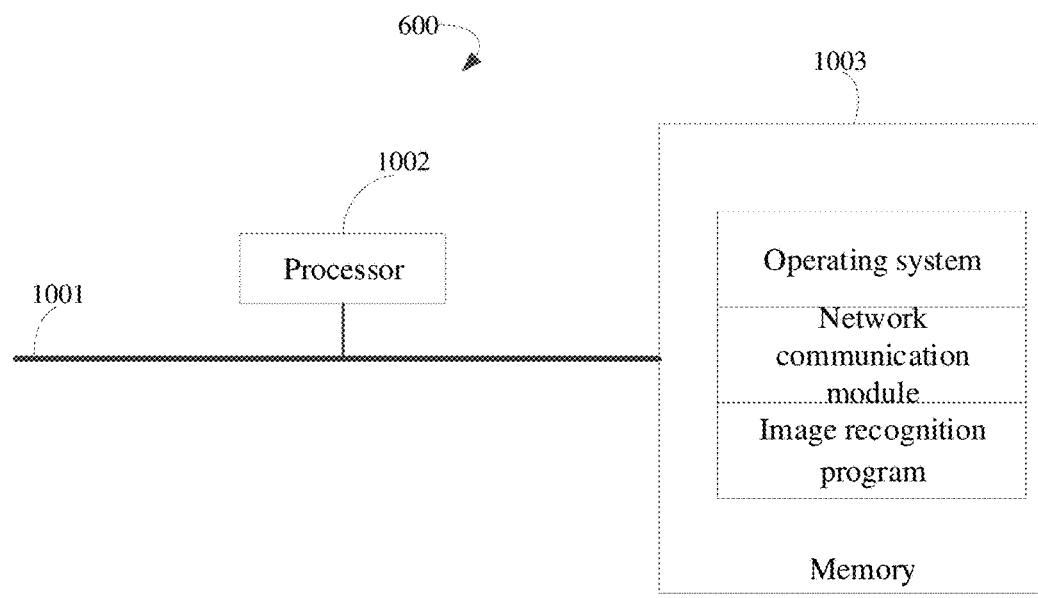
FIG. 6 is a schematic structural diagram of an image recognition device provided by an embodiment of the present disclosure.

Referring to FIG. 6, an embodiment of the present invention also provides an image recognition device 600, which may include a processor 1001, such as a CPU, a memory 1003, and a communication bus 1002. The communication bus 1002 is used to implement connection communication between the processor 1001 and the memory 1003. The memory 1003 may be a high-speed RAM memory, or a steady memory (non-volatile memory), such as a magnetic disk memory. Optionally, the memory 1003 may also be a storage device independent of the foregoing processor 1001.

Optionally, the image recognition device may also include a user interface, a network interface, a camera, an RF (Radio Frequency) circuit, a sensor, an audio circuit, a WiFi module, and the like. The user interface may include a display screen and an input unit such as a keyboard. Optionally, the user interface may also include a standard wired interface and a wireless interface. The network interface can optionally include a standard wired interface and a wireless interface (such as a WI-FI interface). It will be understood by those skilled in the art that the structure of the image recognition device shown in FIG. 6 does not constitute a limitation to the image recognition device, and may include more or less components than those illustrated, or a combination of some components, or different component arrangements.

As shown in FIG. 6, as a computer storage medium, the memory 1003 may include an operating system, a network communication module, and an image recognition program. The operating system is a program that manages and controls hardware and software resources of the image recognition device, and supports the operation of the image recognition program and other software and/or programs. The network communication module is used to implement communication between various components in the memory 1003, and communication with other hardware and software in the image recognition device.

In the image recognition device as shown in FIG. 6, the processor 1001 is configured to execute the image recognition program stored in the memory 1003 to implement the steps of the image recognition method in the foregoing embodiment.

The specific implementation of the image recognition device of the present invention is basically the same as the embodiments of the foregoing image recognition method, and will not be repeated here.

According to the image recognition device based on the deep convolutional neural network provided by the embodiment of the present invention, the lesion areas can also be positioned, and meanwhile, the types or signs of the diseases in the lesion areas can be labeled, thereby providing doctors with more interpretable reference opinions so as to promote the efficiency of the doctor's report and reduce the workload.

Those skilled in the art will appreciate that various steps of the exemplary bifocal image integration method described in the embodiment disclosed herein can be implemented in the form of electronic hardware, computer software, or a combination of both. For clarity of the interchangeability of the hardware and software, the composition and steps of the various examples have been generally described in terms of function in the above description. Whether these functions are executed in the form of the hardware or software depends on the specific application and design constraints of the technical solution.

Those skilled in the art may implement the described functions with different methods for each of particular applications, but such implementation shall not be regarded as going beyond the scope of the present invention. The computer software may be stored in a computer-readable storage medium, and when executed, may include the processes of the above-mentioned method embodiment. The storage medium may be a magnetic disk, an optical disk, a read-only memory, a random memory or the like.

At last, it should be noted: the above embodiments are merely used to illustrate the technical solutions of the present invention, but are not limited thereto. Under the idea of the present invention, the technical features in the above embodiments or different embodiments can also be combined. The steps can be implemented in any order, and there are many other variations of the different aspects of the present invention as described above. For clarity, they are not provided in the details. Although the present invention is described in detail with reference to the above embodiments, an ordinary person skilled in the art should understand: the technical solutions described in the foregoing embodiments may be modified, or some or all of the technical features may be equivalently replaced. However, these modifications and substitutions do not make the corresponding technical solutions depart from the scope of the technical solutions in the embodiments of the present invention.

What is claimed is:

1. An image recognition method based on a deep convolutional neural network, comprising the following steps:
    pre-processing chest X-ray films to obtain initial X-ray film images that meets format requirements;
    screening the initial X-ray film images to detect whether they are posteroanterior chest images;
    inputting the posteroanterior chest images into a binary classification model of the deep convolutional neural network for negative and positive classification;
    inputting the posteroanterior chest images presenting positive results into a detection model of the deep convolutional neural network to detect a disease type in each chest posteroanterior image and label a lesion area in the posteroanterior chest image; and
    displaying the disease type and lesion area corresponding to the posteroanterior chest image;
    wherein the detection model of the deep convolutional neural network comprises a feature extraction network, a feature fusion network, an area generation network, a qualitative determination device, a locator, and a segmenter,
    wherein an output of the feature extraction network serves as an input of the feature fusion network;
    an output of the feature fusion network serves as an input of the area generation network;
    an output of the area generation network serves as an input of the qualitative determination device, wherein the qualitative determination device is used to detect a disease type of the posteroanterior chest image;
    an output of the area generation network serves as an input of the locator, wherein the locator is used to locate a lesion area; and
    an input of the locator serves as an output of the segmenter, wherein the segmenter is used to label an outline of the lesion area.

2. The method according to claim 1, the step of pre-processing the chest X-ray films to obtain the initial X-ray film images that meets format requirements comprises:
    mapping all pixel values of each chest X-ray film to a normal distribution to obtain a window width and a window level; and
    removing noise pixels outside a window width interval, and mapping the removed pixels to an interval range of 0 to 255 to obtain the initial X-ray film image.

3. The method according to claim 2, the step of screening the initial X-ray film images specifically comprises: inputting the initial X-ray film images to a posteroanterior chest screening model for screening, wherein the posteroanterior chest screening model comprises a Resnet-34 feature extraction network and two fully-connected neural networks, wherein
    the Resnet-34 feature extraction network is used to perform chest feature extraction on each initial X-ray film image;
    the first fully-connected neural network is used to determine whether the chest feature is a posteroanterior chest position; and
    the second fully-connected neural network is used to confirm a photometric interpretation of the chest feature.

4. The method according to claim 3, prior to inputting the posteroanterior chest images into the binary classification model of the deep convolutional neural network, the method further comprising:
    if the photometric interpretation of the chest feature means that a grayscale range is a pixel value that rises from light to dark, processing pixels of the initial X-ray film image to obtain a photometric interpretation that a pixel value that rises in a grayscale range from dark to bright.

5. The method according to claim 4, wherein the binary classification model of the deep convolutional neural network is used to perform chest feature extraction on the initial X-ray film images, and perform negative and positive classification on the extracted chest features.

6. The method according to claim 1, further comprising:
    in the case that a classification result in the binary classification model of the deep convolutional neural network is positive, but a disease confidence level output by the detection model of the deep convolutional neural network is less than a set threshold,
    forcefully outputting, by the detection model of the deep convolutional neural maximum confidence level.

7. The method according to claim 6, further comprising:
    visually displaying the lesion area and the disease type corresponding to the lesion area in a chest disease report.

8. The method according to claim 1, wherein a training set of the binary classification model of the deep convolutional neural network and a training set of the detection model of the deep convolutional neural network both come from an image archiving and communication system.

9. An image recognition device, comprising a memory, a processor, a communication bus, and an image recognition program stored in the memory, wherein the communication bus is used to realize a communication connection between the processor and the memory; and
    the processor is used to execute the image recognition program to implement the steps of an image recognition method wherein the image recognition method comprises:
    pre-processing chest X-ray films to obtain initial X-ray film images that meets format requirements;
    screening the initial X-ray film images to detect whether they are posteroanterior chest images;

inputting the posteroanterior chest images into a binary classification model of the deep convolutional neural network for negative and positive classification;

inputting the posteroanterior chest images presenting positive results into a detection model of the deep convolutional neural network to detect a disease type in each chest posteroanterior image and label a lesion area in the posteroanterior chest image; and displaying the disease type and lesion area corresponding to the posteroanterior chest image;

wherein the detection model of the deep convolutional neural network comprises a feature extraction network, a feature fusion network, an area generation network, a qualitative determination device, a locator, and a segmenter, wherein an output of the feature extraction network serves as an input of the feature fusion network;

an output of the feature fusion network serves as an input of the area generation network;

an output of the area generation network serves as an input of the qualitative determination device, wherein the qualitative determination device is used to detect a disease type of the posteroanterior chest image;

an output of the area generation network serves as an input of the locator, wherein the locator is used to locate a lesion area; and an input of the locator serves as an output of the segmenter, wherein the segmenter is used to label an outline of the lesion area.

\* \* \* \* \*